US012552216B2

(12) United States Patent
Walters

(10) Patent No.: US 12,552,216 B2
(45) Date of Patent: Feb. 17, 2026

(54) ADJUSTABLE HEIGHT SINGLE AXLE TRAILER

(71) Applicant: Clint Walters, Kamas, UT (US)

(72) Inventor: Clint Walters, Kamas, UT (US)

( * ) Notice: Subject to any disclaimer, the term of this patent is extended or adjusted under 35 U.S.C. 154(b) by 0 days.

(21) Appl. No.: 18/817,146

(22) Filed: Aug. 27, 2024

(65) Prior Publication Data

US 2025/0074130 A1   Mar. 6, 2025

Related U.S. Application Data

(60) Provisional application No. 63/534,987, filed on Aug. 28, 2023.

(51) Int. Cl.
| | | |
|---|---|---|
| *B60G 17/017* | (2006.01) | |
| *B60G 17/015* | (2006.01) | |
| *B60P 3/025* | (2006.01) | |
| *B60P 3/06* | (2006.01) | |
| *B60P 7/08* | (2006.01) | |
| *B62D 63/06* | (2006.01) | |

(52) U.S. Cl.
CPC ....... *B60G 17/017* (2013.01); *B60G 17/0152* (2013.01); *B60P 7/08* (2013.01); *B62D 63/062* (2013.01); *B60G 2202/413* (2013.01); *B60G 2300/04* (2013.01); *B60G 2500/30* (2013.01); *B60P 3/025* (2013.01); *B60P 3/06* (2013.01)

(58) Field of Classification Search
CPC .......... B60G 2300/04; B60G 2300/402; B60G 17/017; B60G 17/0152; B60G 2202/413; B60G 2500/30; B62D 63/062; B60P 7/08; B60P 3/025; B60P 3/06; B60P 3/07
See application file for complete search history.

(56) References Cited

U.S. PATENT DOCUMENTS

| 2,487,701 | A | * | 11/1949 | Getz | ............... | B60P 3/1033 |
| | | | | | | 414/913 |
| 2,736,568 | A | * | 2/1956 | Martin | ............... | B60G 17/023 |
| | | | | | | 74/521 |
| 2,766,050 | A | * | 10/1956 | Stone | ............... | B62D 53/062 |
| | | | | | | 267/245 |

(Continued)

FOREIGN PATENT DOCUMENTS

AU    2016202202 B2 *  4/2021

*Primary Examiner* — Laura Freedman
(74) *Attorney, Agent, or Firm* — Seth Black; Black IP, PLLC

(57) ABSTRACT

Implementations extend to a height adjustable single axle trailer. The trailer can be configured for efficient loading, transportation, and unloading of vehicles, such as side-by-side vehicles. In one implementation, the trailer's T-shape frame includes a longitudinal support with a latitudinal support (axle) affixed to the longitudinal support's rear end. The trailer further includes a hydraulic pump, a battery, and a remote control to operate the raising and lowering of the trailer. The trailer also features first and second suspension arms connected to the latitudinal support, each incorporating lower and upper housings, hydraulic rams, and springs housed within the lower and upper housings, thereby enabling flexible movement of the latitudinal support of the trailer. The hydraulic rams can be controlled to transition the latitudinal support between a lower loading position and an upper transport position.

6 Claims, 15 Drawing Sheets

(56) References Cited

U.S. PATENT DOCUMENTS

| | | | | |
|---|---|---|---|---|
| 3,837,665 | A * | 9/1974 | Schramm | B62D 63/062 |
| | | | | 414/476 |
| 3,913,934 | A * | 10/1975 | Koehn | B62D 53/067 |
| | | | | D12/101 |
| 4,032,167 | A * | 6/1977 | Chereda | B60P 3/07 |
| | | | | 280/789 |
| 4,453,735 | A * | 6/1984 | Penverne | B60G 11/52 |
| | | | | 280/124.128 |
| 4,488,735 | A * | 12/1984 | Hehr | B60P 3/07 |
| | | | | 280/789 |
| 5,161,814 | A * | 11/1992 | Walker | B60P 1/022 |
| | | | | 280/43.24 |
| 5,195,764 | A * | 3/1993 | Schantz | B60P 1/027 |
| | | | | 280/43.23 |
| 5,560,639 | A * | 10/1996 | Nowell | B62D 61/125 |
| | | | | 280/43.11 |
| 5,863,049 | A * | 1/1999 | Mahvi | B60P 1/027 |
| | | | | 280/6.151 |
| 5,887,880 | A * | 3/1999 | Mullican | B60G 9/00 |
| | | | | 280/789 |
| 5,984,340 | A * | 11/1999 | Briscese | B60G 3/00 |
| | | | | 280/43.23 |
| 6,068,276 | A * | 5/2000 | Kallstrom | B62D 21/20 |
| | | | | 280/6.151 |
| 6,135,700 | A * | 10/2000 | Collins | B60P 3/07 |
| | | | | 280/43.23 |
| 6,530,580 | B1 * | 3/2003 | Simpson | B60P 1/027 |
| | | | | 280/43.12 |
| 6,729,828 | B2 * | 5/2004 | Bosich | B60G 7/02 |
| | | | | 280/414.5 |
| 7,044,704 | B1 * | 5/2006 | Roose | B60P 1/025 |
| | | | | 280/43.23 |
| 7,210,888 | B2 * | 5/2007 | Bearden | A01D 87/126 |
| | | | | 414/24.5 |
| 7,243,979 | B1 * | 7/2007 | Stene | B60P 1/027 |
| | | | | 296/181.3 |
| 7,416,201 | B2 * | 8/2008 | Davey | B62D 7/18 |
| | | | | 280/771 |
| 7,618,227 | B2 * | 11/2009 | Smith | B60P 1/027 |
| | | | | 280/43.23 |
| 7,654,609 | B1 * | 2/2010 | McNutt | B60P 3/07 |
| | | | | 280/789 |
| 7,775,529 | B2 * | 8/2010 | Kinkaide | B60G 3/00 |
| | | | | 280/6.153 |
| 8,016,316 | B1 * | 9/2011 | Carlton | B60G 3/08 |
| | | | | 280/789 |
| 8,267,410 | B1 * | 9/2012 | Stutz | B60G 5/00 |
| | | | | 280/43.23 |
| 8,651,510 | B2 * | 2/2014 | Fankhauser | B60G 17/0523 |
| | | | | 280/490.1 |
| 8,820,767 | B1 * | 9/2014 | Osborne | B60G 11/225 |
| | | | | 280/43.13 |
| 9,321,388 | B2 * | 4/2016 | Barnett | B60P 3/122 |
| 9,403,559 | B1 * | 8/2016 | Hadley | B60P 3/00 |
| 9,428,027 | B2 * | 8/2016 | Iliuta | B60P 1/027 |
| 9,452,649 | B2 * | 9/2016 | Tortellier | B60D 1/246 |
| 9,623,780 | B2 * | 4/2017 | Pratt | B62D 53/062 |
| 10,005,504 | B2 * | 6/2018 | Tran | B60D 1/145 |
| 10,245,914 | B2 * | 4/2019 | Kerner | A01M 7/0082 |
| 10,596,948 | B2 * | 3/2020 | Quenzi | B60P 1/162 |
| 11,351,903 | B1 * | 6/2022 | Williamson | B60P 1/027 |
| 11,370,343 | B2 * | 6/2022 | Hoehner | B62D 53/062 |
| 2004/0004333 | A1 * | 1/2004 | Riermann | B60G 3/14 |
| | | | | 280/43.17 |
| 2004/0070157 | A1 * | 4/2004 | Boice | B60P 1/027 |
| | | | | 280/6.15 |
| 2004/0135349 | A1 * | 7/2004 | Palmer | B60D 1/145 |
| | | | | 280/656 |
| 2005/0184485 | A1 * | 8/2005 | Timmermans | B60P 1/027 |
| | | | | 280/43.1 |
| 2006/0186616 | A1 * | 8/2006 | Rudiger | B60G 3/14 |
| | | | | 280/6.15 |
| 2012/0020762 | A1 * | 1/2012 | Roose | B60P 1/025 |
| | | | | 280/6.151 |
| 2018/0272825 | A1 * | 9/2018 | Eagleton | B60P 3/0255 |
| 2023/0123044 | A1 * | 4/2023 | Cochet | B62D 63/061 |
| | | | | 280/656 |
| 2023/0226867 | A1 * | 7/2023 | De Rycke | F16F 13/002 |
| | | | | 280/6.157 |
| 2024/0270145 | A1 * | 8/2024 | Morris | B60P 1/283 |

\* cited by examiner

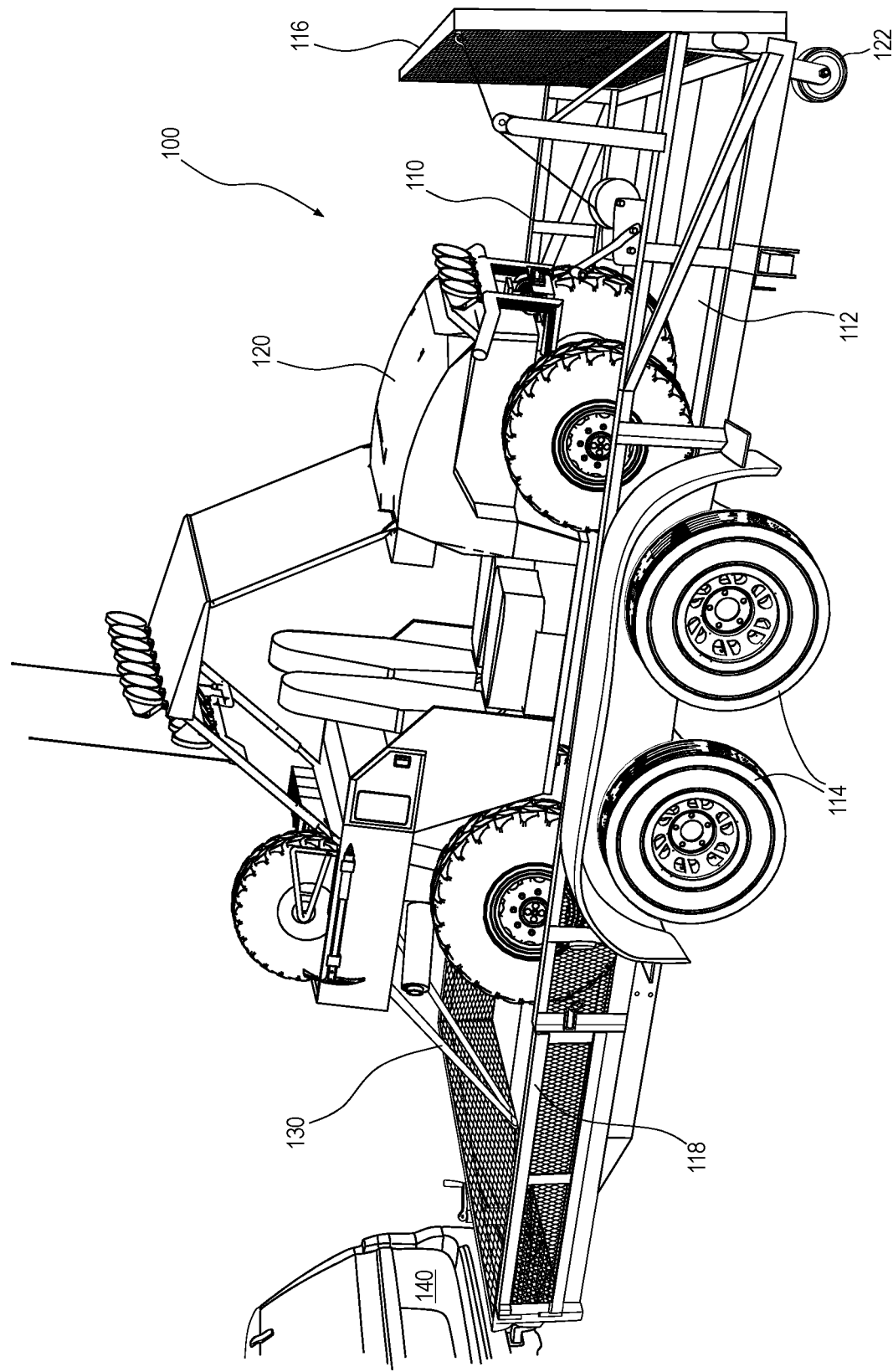
FIG. 1 - Prior Art

ADJUSTABLE HEIGHT SINGLE AXLE TRAILER

CROSS-REFERENCE TO RELATED APPLICATIONS

This application claims the benefit of U.S. Provisional Patent Application No. 63/534,987, entitled "Adjustable Trailer With Suspension," filed Aug. 28, 2023, which is incorporated by reference herein in its entirety.

BACKGROUND

1. Field of the Invention

The invention relates to the field of transportation and, more particularly, to an adjustable height single axle trailer.

2. Background and Relevant Art

The field of transportation encompasses a diverse range of vehicles designed to fulfill various needs. Vehicles, in a broad sense, are tools for moving goods, people, and other cargo between places. One subset of vehicles plays a crucial role in transporting cargo-trailers. Trailers, in essence, are non-motorized vehicles specifically designed to be towed by a motorized vehicle. Trailers come in various forms, each potentially tailored to accommodate specific cargo types and requirements.

Generally, trailers include at least one pair of wheels with an axle and suspension and may also include a platform surface. A trailer is pulled behind another vehicle, such as, a car, truck, van, or motorcycle. Trailers can be used for commercial and/or domestic purposes to transport a wide variety of goods from one place to another.

Some trailers are configured to transport vehicles as cargo. That is, one vehicle can pull a trailer where the trailer cargo is another vehicle. For example, FIG. 1 depicts a trailer 100 for transporting cargo. Trailer 100 is hitched to vehicle 140 and carrying cargo 120 (e.g., a side-by-side vehicle) as cargo.

As depicted, trailer 100 includes frame 110, platform surface 112, transport wheels 114, gate 116, side rails 118, and loading support wheels 122. Cargo 120 is secured to frame 110 with straps 130. Platform surface 112 and wheels 114 are attached to frame 110. FIG. 1 depicts a conventional trailer configuration for carrying a vehicle as cargo.

Various safety concerns and loading/unloading inefficiencies are associated with such conventional trailer configurations.

Conventionally configured trailers can be cumbersome and time-consuming to load and unload. For example, loading cargo 120 onto trailer 100 requires gate 116 to be transitioned to a lowered position (essentially creating a ramp between the ground and platform surface 112). With gate 116 in the lowered position, cargo 120 is then driven up gate 116 and appropriately positioned onto platform surface 112 (e.g., over wheels 114). During loading, loading support wheels 122 can support at least a portion of cargo 120 as cargo 120 is appropriately positioned. After cargo 120 is appropriately positioned, straps 130 are attached to cargo 120 securing cargo 120 to frame 110. Gate 116 can be transitioned to an upper position (i.e., the position depicted in FIG. 1) prior to transporting cargo 120 on trailer 100.

A similar sequence of actions is required when unloading cargo 120 from trailer 100. As such, each of loading cargo 120 onto trailer 110 and unloading cargo 120 from trailer 110 can be a relatively tedious process.

Further, human injury and/or property damage may occur when lowering gate 116. For example, gate 116 can be inadvertently lowered when a person is standing behind trailer 110. The impact of gate 116 on a person can cause soft tissue injury or worse to the person. Additionally, if gate 116 is lowered too quickly, the impact of gate 116 on the ground can damage a roadway surface or driveway. There is also potential for human injury when gate 116 is raised. For example, human extremities may be pinched between gate 116 and portions of frame 110 and/or between gate 116 and portions of platform surface 112.

Thus, loading and unloading cargo 120 is operationally inefficient and prone to possible property damage and to possible human injury.

In operation, for example, when being actively towed, conventionally configured trailers may also be unwieldy due to their weight and dimensions. Thus, maneuvering within confined spaces or navigating challenging terrains, particularly off-road, can pose difficulties, limiting their versatility and practicality.

BRIEF SUMMARY

Examples of the invention extend to trailers, and more particularly to adjustable height single axle trailers.

Aspects of the invention include a trailer having a frame, a latitudinal support (axle), an actuator, a suspension arm, and a wheel assembly. The suspension arm can be mechanically attached to the frame, the actuator, and the wheel assembly. The actuator can control the contraction/extension of hydraulic rams to lower or raise the latitudinal support and rear end of the frame. For example, the actuator can cause one or more hydraulic rams to contract thereby lowering the latitudinal support and rear end of the frame into a lower (loading) position. On the other hand, the actuator can cause one or more hydraulic rams to extend thereby raising the latitudinal support and rear end of the frame into an upper (transport) position.

The actuator can be and/or can include components of a hydraulic, pneumatic, or electric actuator. For example, the actuator can control one or more hydraulic, pneumatic, or electric rams. The suspension arm can include a mechanical force dampener, such as, for example, a coil spring, leaf spring, or shock absorber. The wheel assembly can include a rim and tire attached to the rim, with the rim linked to a hub of the suspension arm.

One implementation pertains to a trailer featuring a frame with an actuator-operated height adjustable suspension system designed for enhanced functionality. The trailer includes a frame, an actuator, and a suspension arm affixed to the frame and actuator. The suspension arm includes a dampener to manage shock absorption.

Another implementation includes a trailer tailored for efficient transportation needs, comprising a frame with a longitudinal and latitudinal support configuration. The latitudinal support mechanically attaches to the rear end of the longitudinal support, forming a stable and rigid structure. The trailer incorporates a hydraulic pump responsible for actuating first and second suspension arms connected to the latitudinal support. The suspension arms include springs and hydraulic rams that facilitate extension or contraction of the arms. As such, the frame's movement can be adjusted between a lower loading position and an upper transport position. The trailer can include a flow divider that (essentially equally) distributes hydraulic energy between the hydraulic rams. The trailer can also include a cargo coupler and pins that secure cargo to the trailer. The trailer can also include a trailer coupler (e.g., a trailer tongue) for connecting the trailer to a vehicle configured to pull the trailer. For example, the trailer coupler can be connected to a trailer hitch of the vehicle.

In one more specific aspect, a trailer is tailored for loading, transport, and unloading of side-by-side vehicles. The trailer's frame includes a longitudinal support with a latitudinal support affixed to its rear end, creating essentially a T-shape. Positioned atop the longitudinal support (e.g., at an end nearer a trailer coupler) is a compartment. The compartment houses a hydraulic pump, along with a battery and a remote control for operation. The trailer includes first (e.g., right) and second (e.g., left) suspension arms connected to the latitudinal support. Each suspension arm can include lower and upper housings, hydraulic rams, and springs, enabling flexible movement.

Accordingly, the frame and latitudinal support can be selectively transitioned between a lower loading position and an upper transport position. Other components can include a trailer coupler (e.g., near the frame's front end) and a cargo coupler and pins facilitating the securing of cargo (e.g., used to secure a side-by-side vehicle). Additional components can include one or more loading ramps, for example, spaced evenly from the latitudinal support's midpoint, guiding posts, and pads atop the latitudinal support. A flow divider can facilitate synchronized movement of hydraulic rams when actuated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered limiting of its scope, implementations will be described and explained with additional specificity and detail through the use of the accompanying drawings in which:

FIG. 1 illustrates a prior art trailer loaded with cargo.

DETAILED DESCRIPTION

Figure 2A:
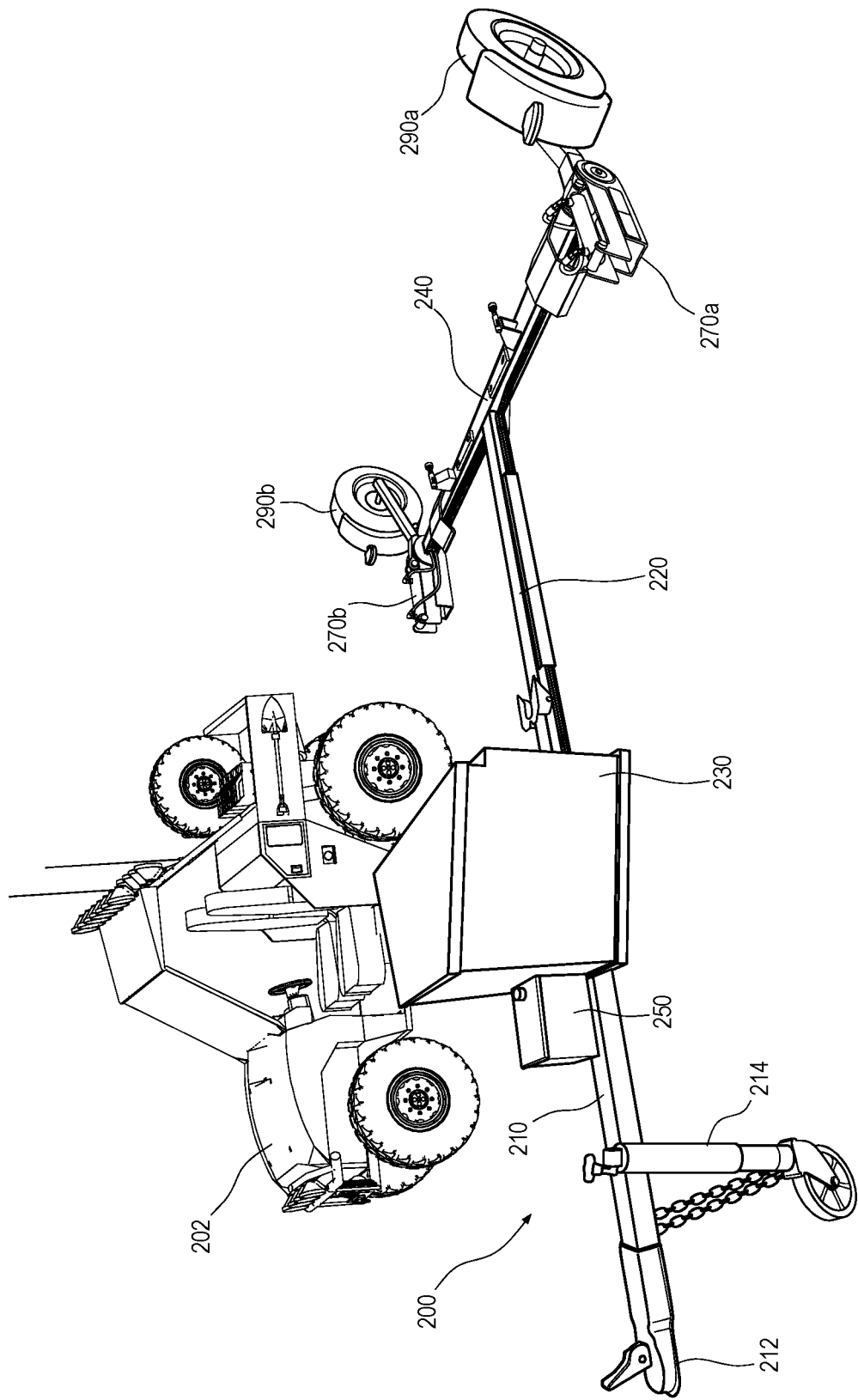
FIG. 2A illustrates a front, first side perspective view of an example single axle trailer in a lowered (loading) position.

Examples extend to trailers, particularly adjustable height single axle trailers.

Trailers serve a wide range of practical and recreational purposes. Trailers can be attached to other vehicles and facilitate transporting various items, such as vehicles, boats, camping gear, furniture, and equipment, that might be too large or cumbersome to fit within a primary vehicle and/or that are not configured for self-propelled travel on land. Trailers provide additional storage and hauling capacity, enabling individuals to embark on road trips, move belongings, engage in outdoor activities, or even transport specialized equipment for work or hobbies. Whether for utilitarian or leisure purposes, trailers offer convenience, flexibility, and the ability to supplement the storing/hauling capabilities of a motorized vehicle, making them a valuable asset for a variety of tasks and adventures.

Loading and unloading trailers can often prove to be challenging, time-consuming, and labor-intensive. Loading and unloading cargo require care to ensure that items are appropriately positioned on (or in) a trailer. Appropriate care and cargo positioning reduces the chance of accidents or other damage during transit. Bulky or heavy items might require specialized equipment or assistance to lift and place into the trailer correctly.

Moreover, arranging items within the limited space of a trailer demands strategic organization to maximize efficiency and minimize the risk of shifting during transportation. Additionally, the size and weight of trailers can make maneuvering them a challenging endeavor, especially for individuals who are less experienced in towing. Navigating through tight spaces, reversing, and parking can demand a higher level of skill and concentration, potentially leading to stressful situations. As a result, trailer operation necessitates skill and attention to detail to ensure a safe and successful towing experience.

In accordance with aspects of the invention, a trailer can include a frame, a latitudinal support (axle), an actuator, a suspension arm, and a wheel assembly. The suspension arm can be mechanically attached to the frame and the actuator. The wheel assembly can be mechanically attached to the suspension arm. In such a configuration the actuator can be utilized to lower the suspension arm and axle and to raise the suspension arm and axle. For example, the actuator can contract to lower the suspension arm (and latitudinal support) moving the frame into a lower (loading) position. On the other hand, the actuator can extend to raise the suspension arm (and latitudinal support) moving the frame into an upper (transport) position. In the lower (loading) position, the trailer can be loaded with cargo, like a side-by-side vehicle, and in the upper (transport) position the trailer can transport the cargo loaded thereon.

The actuator can be any of a hydraulic actuator, a pneumatic actuator, or an electric actuator.

In general, the trailer can be used to transport cargo, such as, for example, a side-by-side vehicle.

The frame can include a longitudinal support along with the latitudinal support (axle). The longitudinal support can include a front end (an end closer to a trailer coupler, for example, a trailer tongue) and a rear end (an end closer and mechanically attached to the latitudinal support). The latitudinal support can be mechanically attached to the rear end of the longitudinal support at essentially the middle of the latitudinal support. In one aspect, the rear end of longitudinal support is attached to the latitudinal support essentially equidistant between a first wheel assembly and a second wheel assembly. The first wheel assembly being at one end of the latitudinal support (e.g., on a right side of the trailer) and the second wheel assembly being at another end of the latitudinal support (e.g., on a left side of the trailer).

In one aspect, the frame of the trailer includes a trailer coupler on the front end of the longitudinal support for connecting to another vehicle (e.g., a car, a van, or a truck) that may tow the trailer.

The actuator can be and/or can include components of one of a hydraulic, pneumatic, or electric actuator. For example, in one or more aspects the actuator controls a hydraulic, pneumatic, or electric ram that extends and contracts to move the suspension arm. In another aspect, the actuator interoperates with a hydraulic pump connected to a pair of hydraulic rams such that the actuator can contract or extend a pair of suspension arms of the trailer to lower or raise the trailer for loading or transport.

In yet another aspect, the actuator includes a hydraulic pump that comprises a motor, a hydraulic reservoir, and a remote control, a battery connected to the hydraulic pump, and a pair of hydraulic rams connected to the hydraulic pump to move the trailer up and down. The actuator may further include a flow divider connected between the hydraulic pump and the pair of hydraulic rams to equally distribute hydraulic energy of the hydraulic pump between the hydraulic rams such that the hydraulic rams move in unison (e.g., essentially at the same rate) when actuated by the hydraulic pump.

The suspension arm is attached to the frame (e.g., to the latitudinal support, such as, an axle) and the actuator. In one aspect, the suspension arm includes a dampener, such as a coil spring, a leaf spring, or a shock absorber.

In another aspect, the trailer includes a pair of suspension arms attached to opposing ends of the latitudinal support (e.g., on a right side of the trailer and on a left side of the trailer). Each suspension arm can include a suspension portion with a hydraulic ram and a spring and a wheel portion attached to the hydraulic ram. In yet another aspect, each suspension arm includes a lower housing attached to the latitudinal support, an upper housing rotationally attached to the latitudinal support, a wheel portion rotationally attached to the latitudinal support, a hydraulic ram attached at one end to the upper housing and at another end to the wheel portion, and a spring attached to the lower and upper housings.

A wheel assembly can be mechanically attached to the (or each) suspension arm. A wheel assembly can include a rim and a tire mounted to the rim with the rim attached to a hub of the suspension arm. In one or more aspects, the trailer includes a wheel assembly mechanically attached to respective suspension arms at each end of the latitudinal support (axle), such as, on a right side and left side of the trailer.

Accordingly, an actuator (or actuators) can control contraction of one or more rams to selectively lower a trailer frame into a lower loading position. On the other hand, the actuator (or actuators) can control extension of the one or more rams to selectively raise a trailer frame into an upper transport position. For example, a hydraulic pump can simultaneously actuate the first and second hydraulic rams to contract or extend the respective first and second suspension arms to move the latitudinal support of the frame between the lower loading position and the upper transport position respectively.

As described, FIG. 1 illustrates a prior art trailer 100 hitched to vehicle 140 and loaded with cargo 120 (e.g., a side-by-side vehicle). As depicted, trailer 100 includes frame 110, platform surface 112, transport wheels 114, gate 116, side rails 118, and loading support wheels 122. Cargo 120 is secured to frame 110 with one or more straps 130. Platform surface 112 and transport wheels 114 are attached to frame 110.

FIG. 2A illustrates a front, first side perspective view of an example single axle trailer 200 in a lowered (loading) position. In general, trailer 200 can be selectively transitioned between a lower position to load and unload cargo and an upper position to transport cargo. Cargo can include, but is not limited to, any of a recreational vehicle, a side-by-side vehicle, a utility terrain vehicle, an all-terrain vehicle, a motorcycle, a bicycle, or an automobile.

As depicted, trailer 200 includes frame 210, trailer coupler 212, trailer jack 214, compartment 230, actuator 250, suspension arms 270a and 270b, and wheel assemblies 290a and 290b. Frame 210 includes longitudinal support 220 and latitudinal support 240 (e.g., an axle). Longitudinal support 220 includes a front end (an end nearer trailer coupler 212) and a rear end (an end nearer latitudinal support 240). Longitudinal support 220 may be referred to as a lengthwise support, support tube, center post, center beam, or center bar.

Latitudinal support 240 has a first side (e.g., a driver's side or left side) end and a second side (e.g., a passenger's side or right side) end. Latitudinal support 240 is mechanically attached to the rear end of longitudinal support 220 (e.g., essentially bisected in the middle thereby forming a T shape). Latitudinal support 240 may also be referred to as a widthwise support or cross member.

Actuator 250 can be any of a hydraulic actuator, a pneumatic actuator, or an electric actuator. In one aspect, actuator 250 (e.g., a hydraulic pump) is mechanically attached to frame 210. Actuator 250 is hydraulically connected to a hydraulic ram in suspension arm 270a and to a hydraulic ram in suspension arm 270b. Furthermore, suspension arm 270a is mechanically attached to corresponding wheel assembly 290a and suspension arm 270b is mechanically attached to corresponding wheel assembly 290b.

As depicted in FIG. 2A, trailer 200 is in a lower loading position with the rear of frame 210, and more particularly latitudinal support 240, near or closer to a support surface (e.g., the ground). In the lower loading position, cargo, such as, vehicle 202, can be more efficiently and safely loaded and unloaded from trailer 200.

Trailer coupler 212, which may be referred to as a ball hitch coupler or trailer tongue, is configured to mate, couple, attach, or otherwise connect to a trailer hitch at a motorized vehicle (not shown). Once attached, the vehicle can tow trailer 200. Trailer jack 214 is attached proximate the front end of longitudinal support 220. Trailer jack 214 can be used to raise and lower the front end of longitudinal support 220 to assist in mating, coupling, attaching, or otherwise connecting trailer 200 to a motorized vehicle.

Figure 2B:
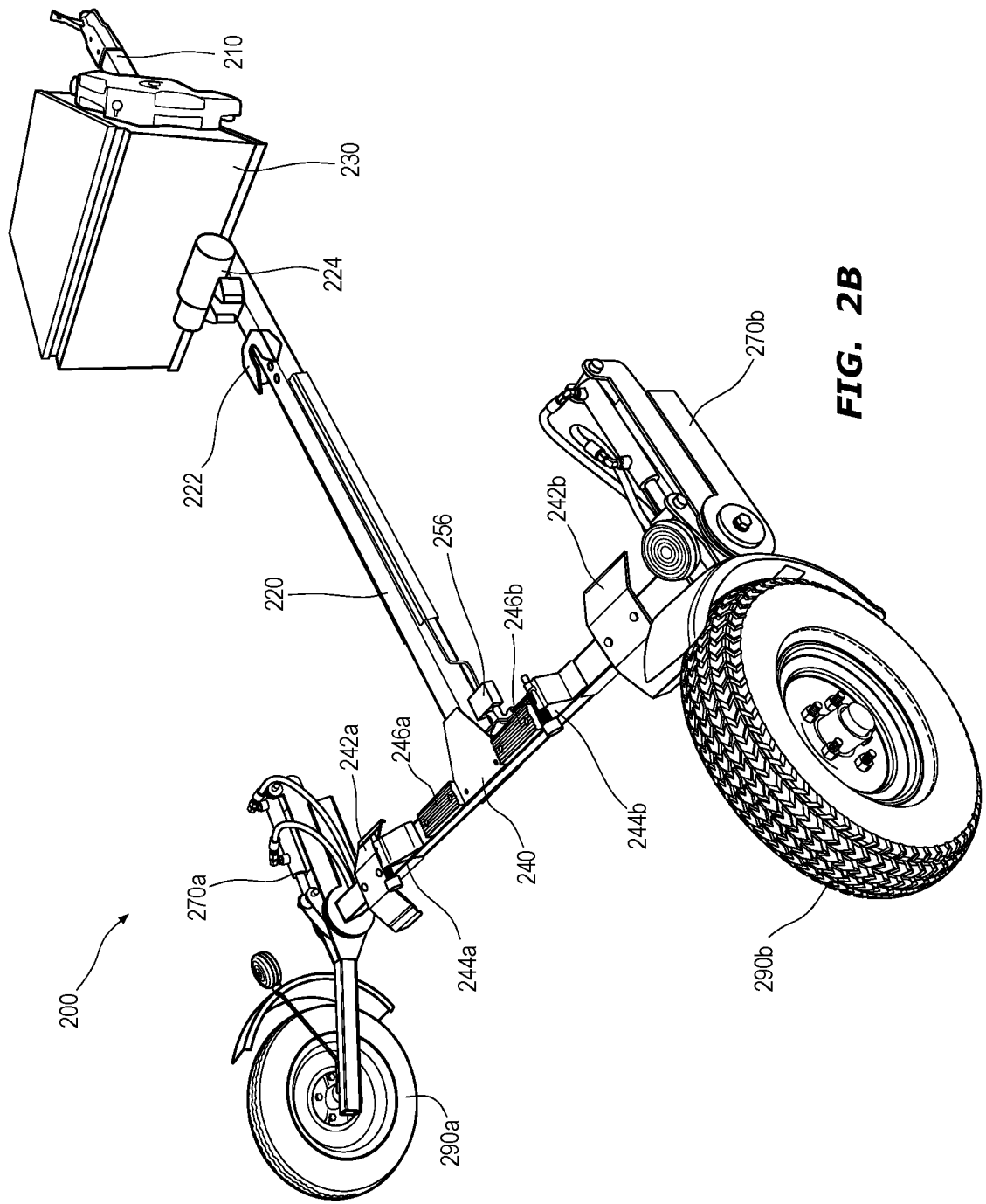
FIG. 2B illustrates a rear, second side perspective view of the example trailer in the lowered (loading) position.

FIG. 2B illustrates a rear, second side perspective view of trailer 200 in the lowered (loading) position. As depicted in FIG. 2B trailer 200 further includes cargo coupler 222, winch 224, ramps 242a and 242b, posts 244a and 244b, pads 246a and 246b, and flow divider 256.

Cargo coupler 222 is mechanically attached atop longitudinal support 220. Cargo coupler 222 can be configured to mate with a corresponding cargo feature to secure cargo to frame 210. In one aspect, the corresponding cargo feature is a cargo button on the underside of a vehicle, such as, vehicle 202.

As depicted, ramp 242a is attached proximate one side end of latitudinal support 240 and ramp 242b is attached proximate another opposing side end of latitudinal support 240. In one aspect, ramp 242a and ramp 242b are spaced essentially equidistant and opposite from the middle of latitudinal support 240. Ramps 242a and 242b may be referred to as tire wedges.

Post 244a is attached to latitudinal support 240 between the middle of latitudinal support 240 and ramp 242a. Likewise, post 244b is attached to latitudinal support 240 between the middle of latitudinal support 240 and ramp 242b. Thus, post 244a and post 244b are essentially equidistant and opposite one another from the middle of latitudinal support 240. Post 244a and post 244b can be configured to guide cargo (e.g., a side-by-side vehicle) onto and off of trailer 200 during loading and unloading. Posts 244a and 244b may be referred to as guiding posts.

Pads 246a and 246b are each attached atop latitudinal support 240. Pads 246a and 246b can be made out of a material softer than metal, such as, rubber, silicone, plastic, etc. Pads 246a and 246b provide an area on frame 210 for cargo to rest without rubbing on metal. Pads 246a and 246b are essentially equidistant and opposite one another from the middle of latitudinal support 240.

Winch 224 is mechanically attached to support 240 between compartment 230 and cargo coupler 222. Winch 224 can assist in loading and unloading cargo from trailer 200.

Flow divider 256 is mechanically attached to frame 210 near where longitudinal support 220 and latitudinal support 240 mechanically attach to one another. Flow divider 256 is hydraulically connected between actuator 250 (in FIG. 2A) and corresponding hydraulic rams (e.g., hydraulic ram 276a in FIGS. 2I, 2J, and 2K) at suspension arms 270a and 270b. Flow divider 256 facilitates essentially equal distribution of hydraulic energy to the corresponding hydraulic rams at suspension arms 270a and 270b. Equal distribution of hydraulic energy facilitates moving the corresponding hydraulic rams in unison, in turn moving latitudinal support at essentially the same rate (either up or down) on both sides of trailer 200.

Figure 2C:
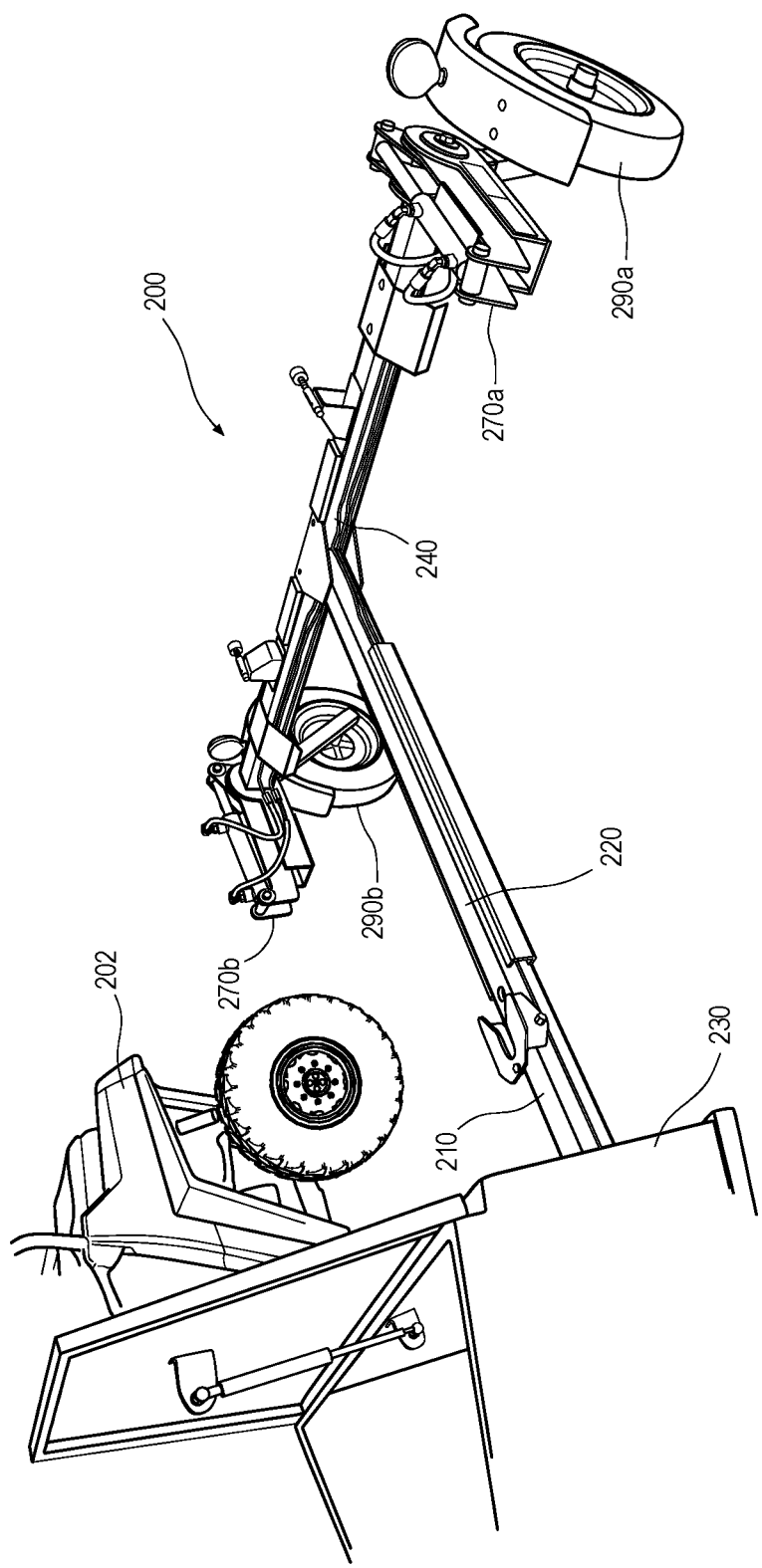
FIG. 2C illustrates a front, first side perspective view of the example trailer in an upper (transport) position.

FIG. 2C illustrates a front, first side perspective view of trailer 200 in an upper (transport) position. As depicted in FIG. 2C, when trailer 200 is in the upper transport position, frame 210 (particularly, latitudinal support 240) is far or further away from a support surface (e.g., the ground). In the upper transport position, trailer 200 facilitates transport of loaded/attached cargo.

Actuator 250 transitions trailer 200 between the lower loading position and the upper transport position by hydraulically actuating hydraulic rams in suspension arms 270a and 270b. Actuator 250 can cause hydraulic rams to contract thereby lowering latitudinal support 240 (and correspondingly lowering the rear end of frame 210). On the other hand, actuator 250 can cause hydraulic rams to extend thereby raising latitudinal support 240 (and correspondingly raising the rear end of frame 210). Actuator 250 can change hydraulic energy, which flow divider 256 then essentially evenly distributes to the hydraulic rams, causing the hydraulic rams to contract or extend essentially in unison.

In other aspects, components of trailer 200 are arranged such that contracting hydraulic rams causes latitudinal support 240 to lower and extending hydraulic rams causes latitudinal support 240 to raise.

Figure 2D:
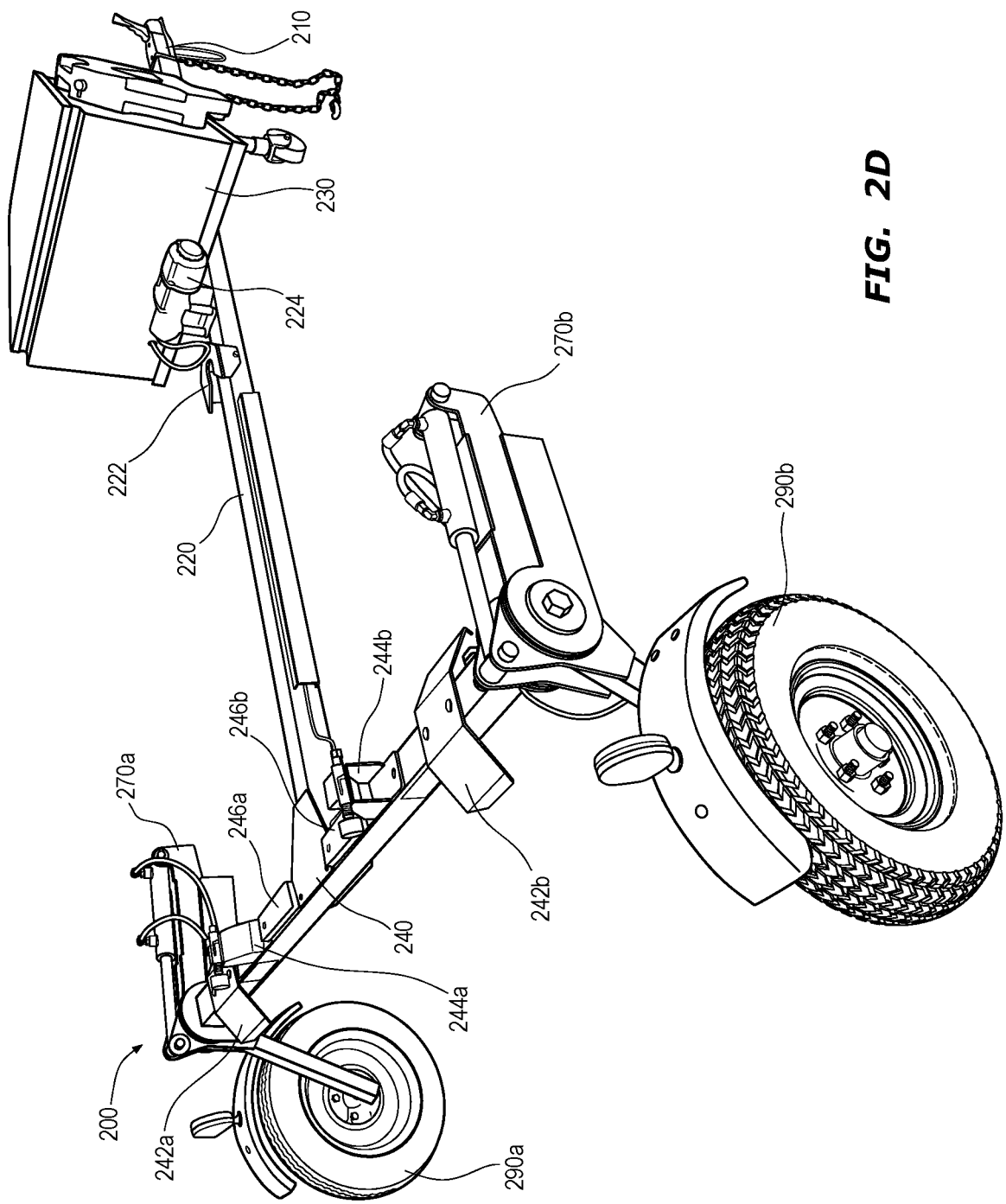
FIG. 2D illustrates a rear, second side perspective view of the example trailer in the upper (transport) position.

FIG. 2D illustrates a rear, second side perspective view of trailer 200 in the upper (transport) position. Similar to FIG. 2C, when trailer 200 is in the upper transport position, frame 210 (particularly, latitudinal support 240) is far or further away (and at least relative to a lower loading position) from a support surface (e.g., the ground) to facilitate transport of cargo on trailer 200.

Figure 2E:
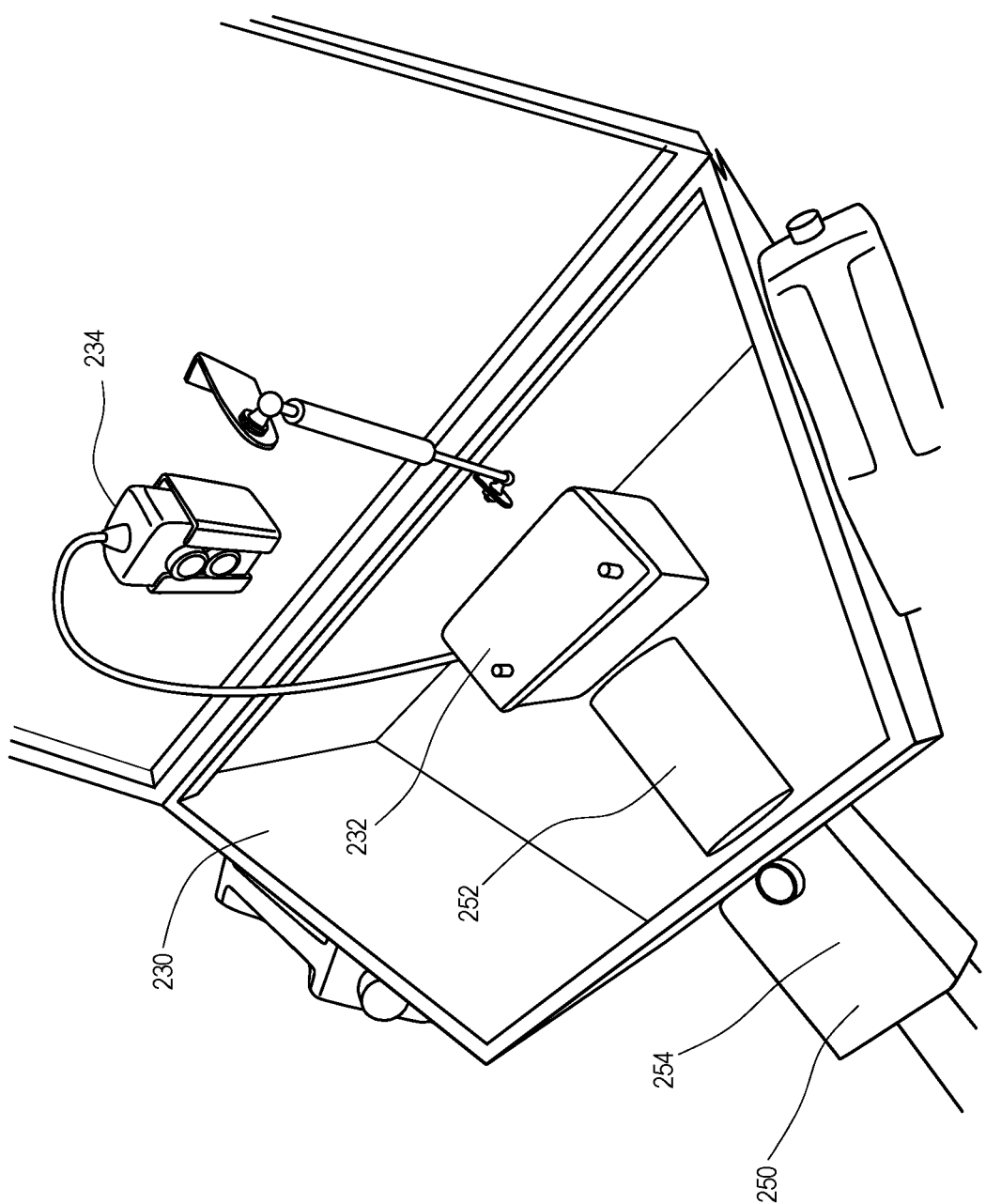
FIG. 2E illustrates a front, first side perspective view of inside a compartment of the example trailer.

FIG. 2E illustrates a front, first side perspective view of inside compartment 230. As depicted, compartment 230 contains battery 232, remote control 234, and actuator motor 252 (e.g., a hydraulic motor). Actuator 250 (e.g., a hydraulic pump), containing actuator reservoir 254 (e.g., a hydraulic reservoir), is located next to compartment 230. Actuator motor 252 is electrically connected to battery 232 and hydraulically connected to actuator 250.

In one aspect, actuator 250 activates actuator motor 252 to push hydraulic fluid from actuator reservoir 254 to flow divider 256. Flow divider 256 (e.g., evenly) divides distribution of the pushed hydraulic fluid to hydraulic rams causing the hydraulic rams to extend thereby raising latitudinal support 240. In another aspect, actuator 250 activates actuator motor 252 to pull hydraulic fluid from hydraulic rams into actuator reservoir 254. Flow divider 256 (e.g., evenly) divides distribution of the pulled hydraulic fluid from hydraulic rams causing the hydraulic rams to contract thereby lowering latitudinal support 240.

A user can manipulate remote control 234 to cause actuator 250 to push hydraulic fluid to or pull hydraulic fluid from hydraulic rams and correspondingly move trailer 200 between a lower loading position and an upper transport position.

Figure 2F:
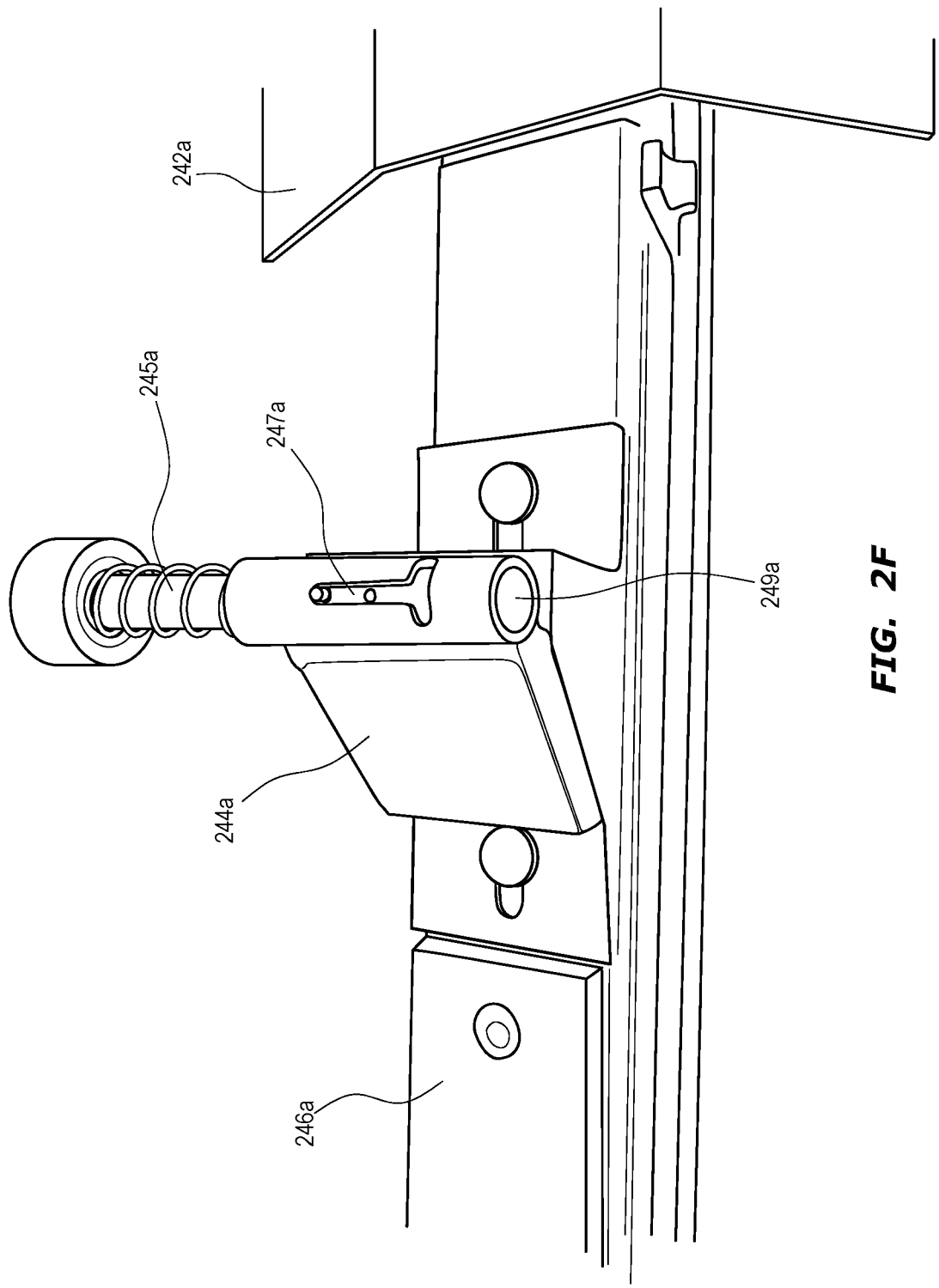
FIG. 2F illustrates a front, top perspective view of a ramp, post, pin, and pad of the example trailer.

FIG. 2F illustrates a front, top perspective view of a ramp, post, pin, and pad of trailer 200. FIG. 2F is a closer view of components mechanically attached to latitudinal support 240 proximate to suspension arm 270a. FIG. 2F depicts ramp 242a, post 244a, and pad 246a, as well as pin 245a, locking groove 247a, and pin head 249a (of pin 245a).

Pin 245a is slidably attached on top of post 244a. Pin 245a includes a pin spring and a protrusion set in a locking groove 247a on top of post 244a such that pin head 249a can selectively protrude to secure onto cargo (e.g., a side-by-side vehicle) when loaded onto the trailer. A mirror image of the features shown in FIG. 2F can also be part of trailer 200 and such features are mechanically attached to latitudinal support 240 proximate to suspension arm 270b.

As such, cargo loaded onto trailer 200 can be secured in at least three places on trailer 200. Cargo can be secured at cargo coupler 222, at pin 245*a*, and at another pin proximate to suspension arm 270*b*. Features of loaded cargo (e.g., a side-by-side vehicle) can mate with cargo coupler 222, pin 245*a*, and the other pin proximate to suspension arm 270*b* to facilitate cargo attachment (and securement) to trailer 200.

Figure 2G:
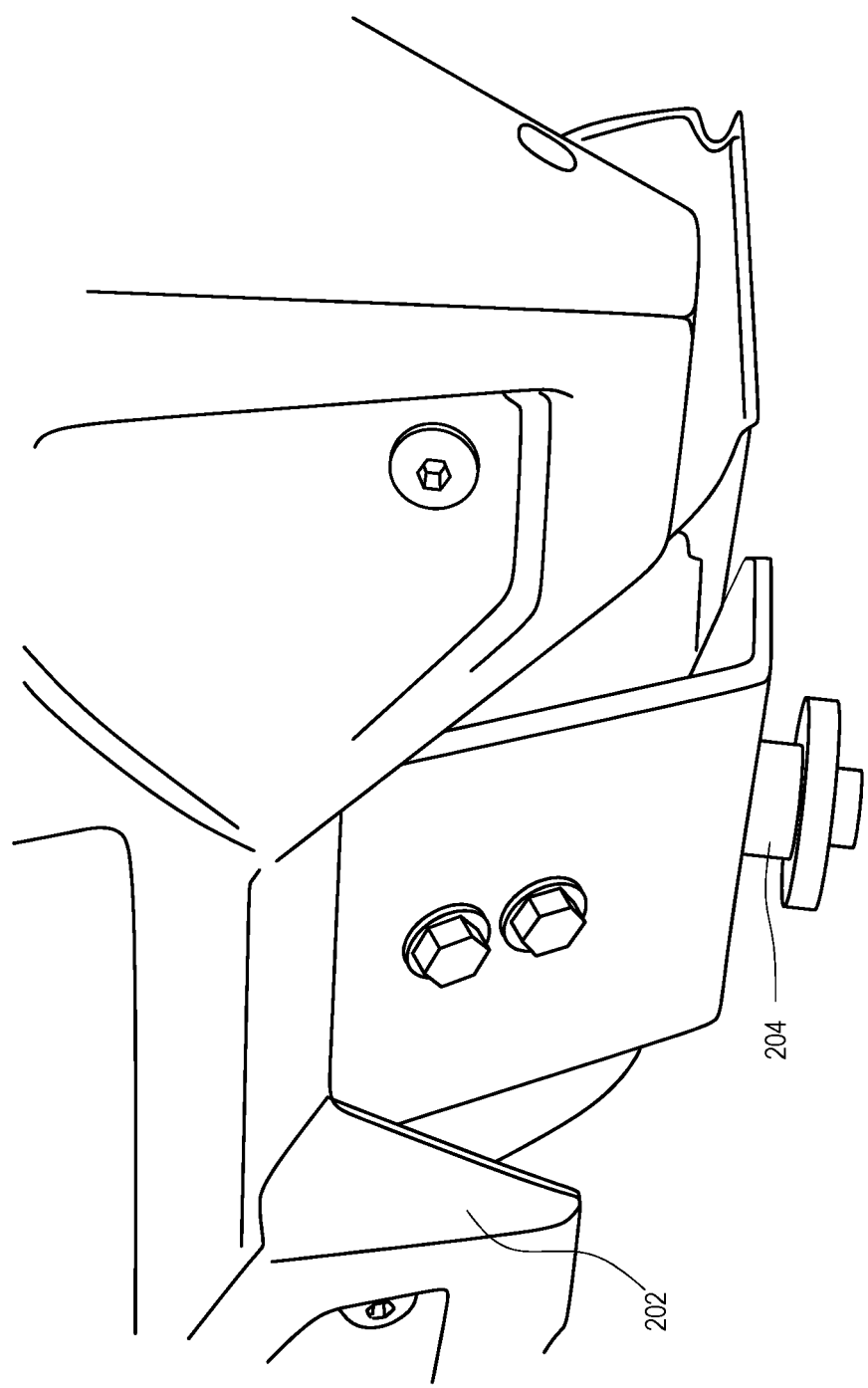
FIG. 2G illustrates a front, first side perspective view of a cargo button capable of mating with the example trailer to secure cargo to the example trailer in accordance with the implementation.

FIG. 2G illustrates a front, first side perspective view of a cargo button capable of mating with trailer 200 to secure cargo to trailer 200. FIG. 2G depicts a cargo button 204 mechanically attached to cargo 202 (a side-by-side vehicle). Cargo button 204 can be a pole with flange or other similar structure configured to mate with cargo coupler 222. Mating of cargo button 204 with cargo coupler 222 secures cargo 202 to trailer 200, preventing (e.g., forward) movement of cargo 202 on trailer 200.

Figure 2H:
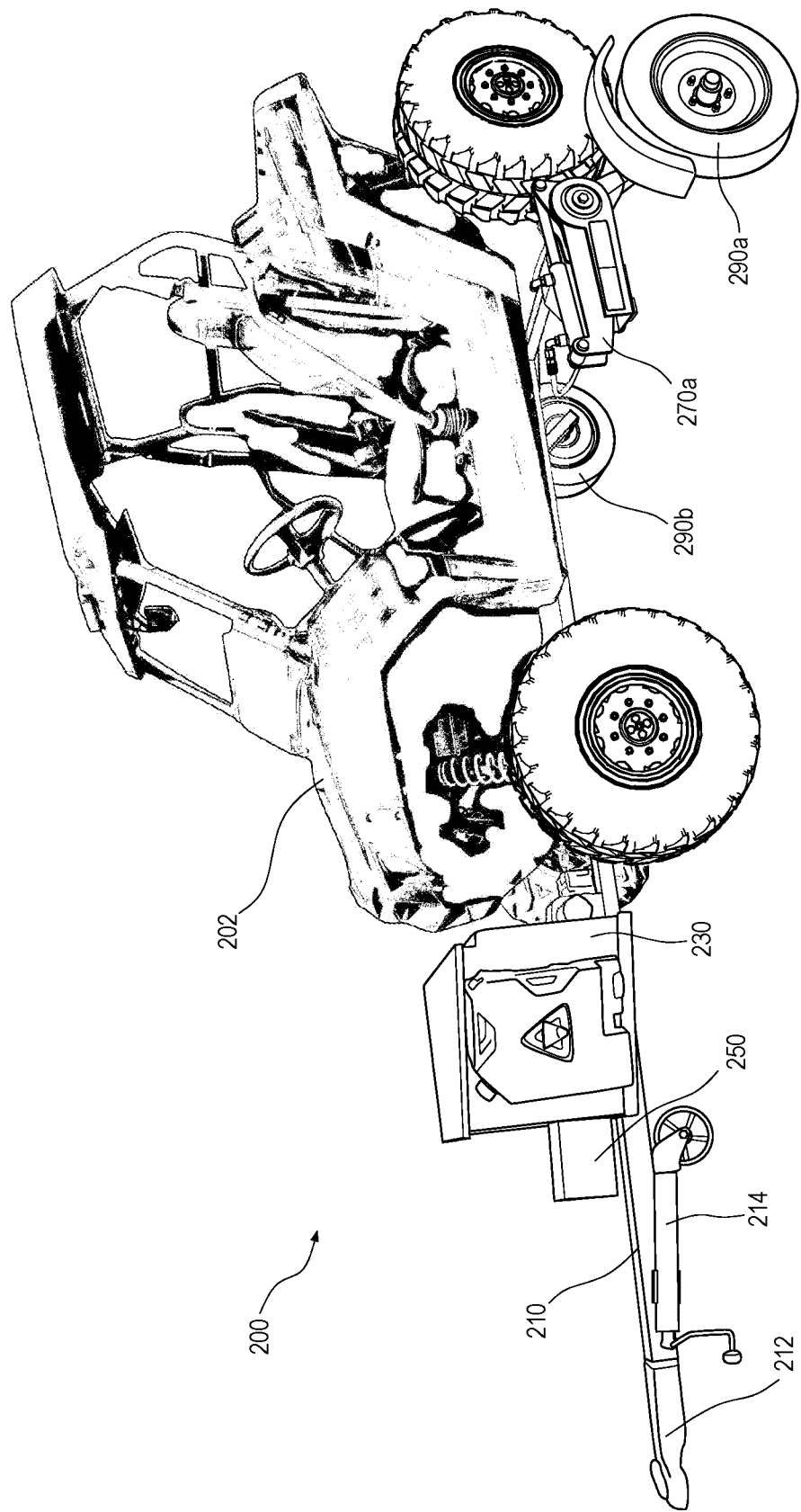
FIG. 2H illustrates a first side view of the example trailer in the upper (transport) position and loaded with cargo, namely a side-by-side vehicle.

FIG. 2H illustrates a first side view of trailer 200 in the upper (transport) position and loaded with cargo 202 (a side-by-side vehicle). As depicted, trailer 200 is in an upper transport position and cargo 202 is secured thereupon. Additionally, trailer coupler 212 is attached to a motorized vehicle (not shown) to tow trailer 200. Trailer jack 214 is lifted so trailer 200 can travel on wheel assemblies 290*a* and 290*b*.

As further depicted, when trailer 200 is loaded with cargo 202, such as a side-by-side vehicle, the cargo 202 comes to rest on the frame 210, including on longitudinal support 220 and latitudinal support 240. As described, it may be that actuator 250 causes suspension arms 270*a* and 270*b*, as well as wheel assemblies 290*a* and 290*b*, to move from the lower loading position to the upper transport position. When trailer 200 transitions to an upper transport position from a lower loading position, cargo 202 (positioned over frame 210) is lifted moving cargo 202 off the ground so that cargo 202 may be transported by trailer 200.

Figure 2I:
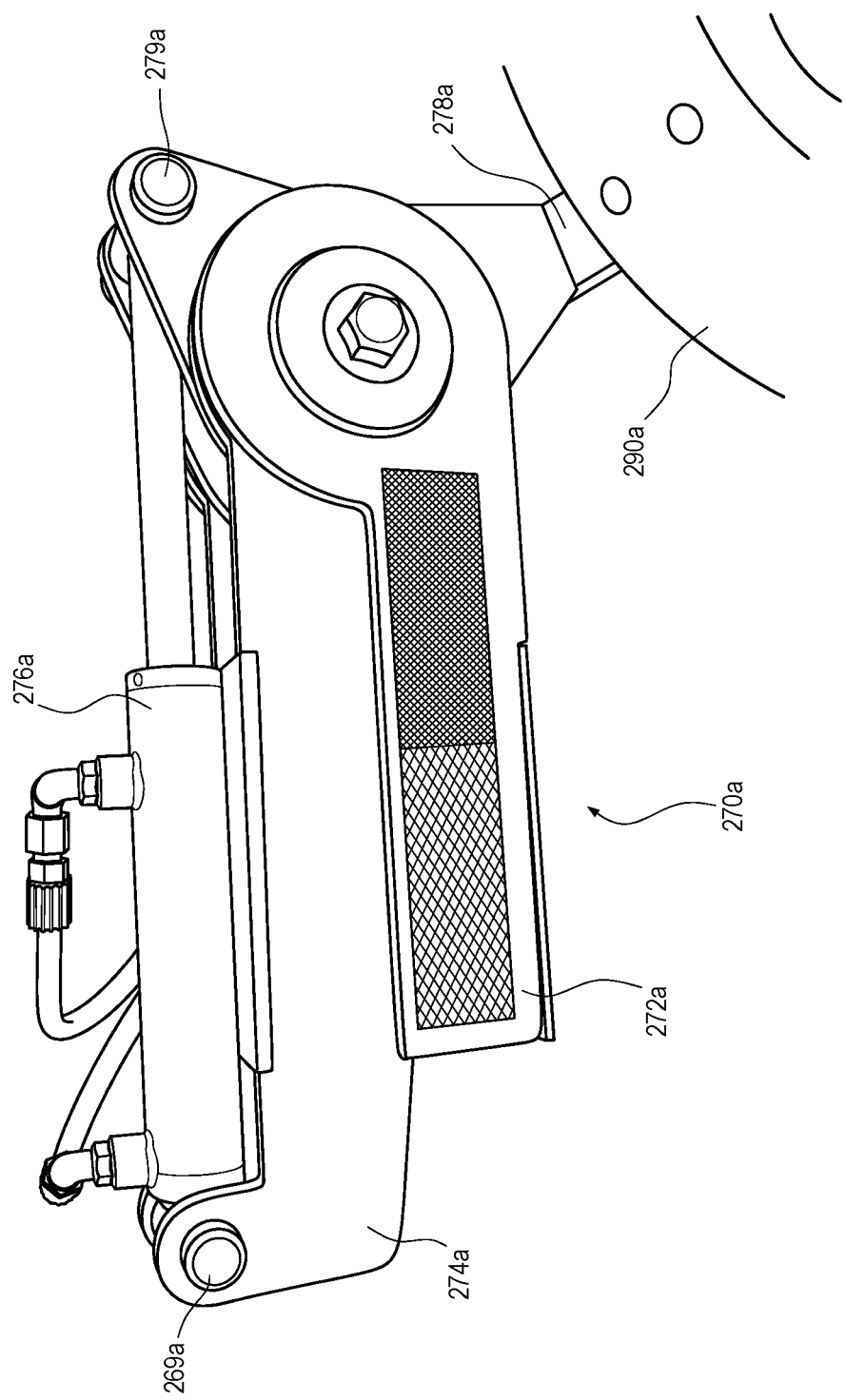
FIG. 2I illustrates a first side view of a suspension arm and a wheel assembly of the example trailer.

FIG. 2I illustrates a first side view of suspension arm 270*a* and a wheel assembly 290*a*. More specifically, FIG. 2I depicts suspension arm 270*a* attached to a side end of latitudinal support 240. Suspension arm 270*a* includes an outer side of lower housing 272*a* mechanically attached to latitudinal support 240. Suspension arm 270*a* also includes an outer side of upper housing 274*a* rotationally mechanically attached to latitudinal support 240. Moreover, suspension arm 270*a* includes wheel portion 278*a* rotationally mechanically attached to latitudinal support 240. Furthermore, suspension arm 270*a* includes hydraulic ram 276*a* attached at one end 269*a* to upper housing 274*a* and at another end 279*a* to wheel portion 278*a*.

Similar components, and even a mirror image of the components depicted in FIG. 2I, can be included on trailer 200 at or proximate to suspension arm 270*b* attached to another side end of latitudinal support 240.

Figure 2J:
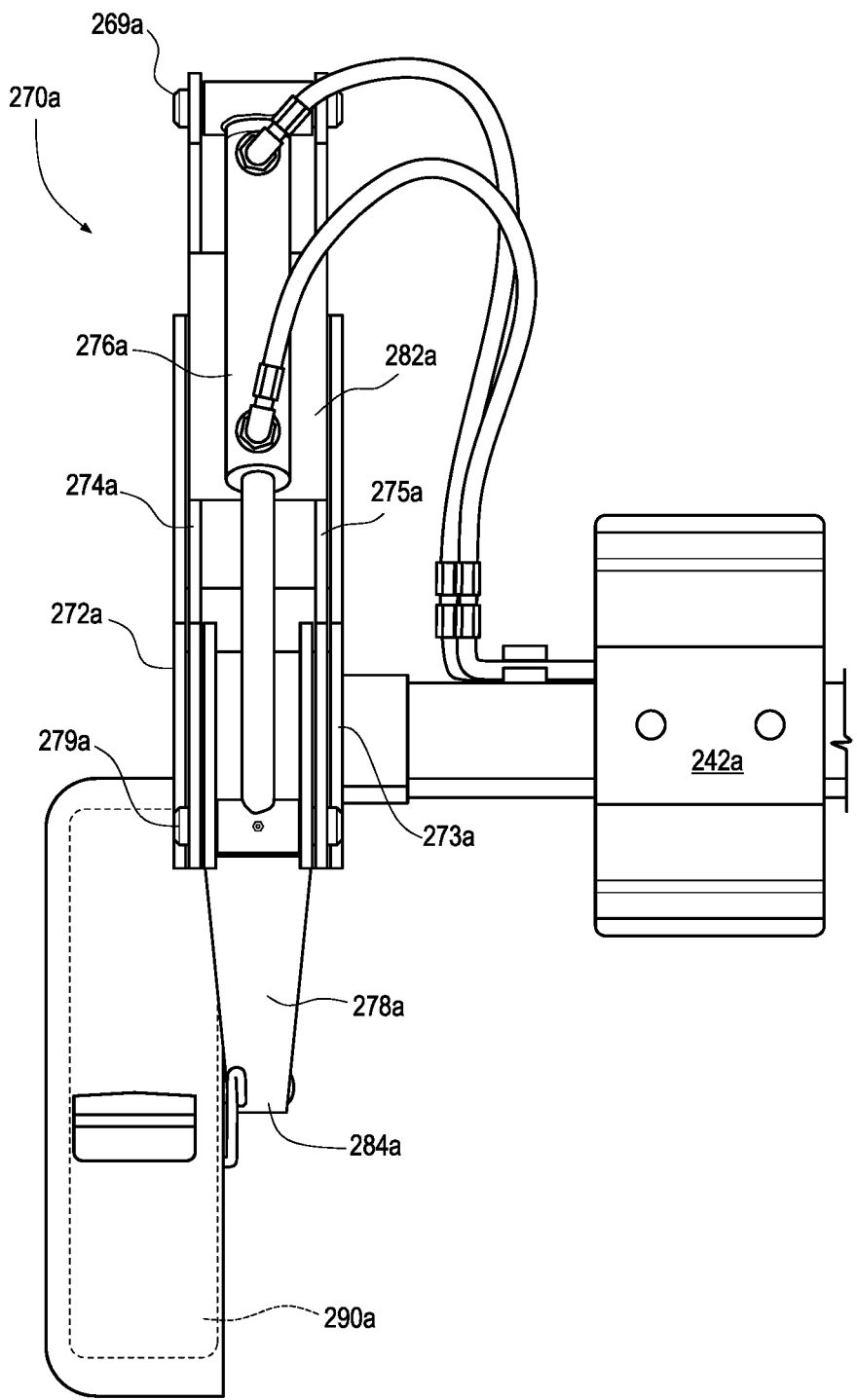
FIG. 2J illustrates a top view of the suspension arm and the wheel assembly of FIG. 2I.

FIG. 2J illustrates a top view of suspension arm 270*a* and wheel assembly 290*a*. As depicted, a lower housing is mechanically attached to latitudinal support 240 and includes outer side 272*a* and inner side 273*a*. Suspension arm 270*a* also includes outer side 274*a*, inner side 275*a*, and top 282*a* of upper housing which is rotationally mechanically attached to latitudinal support 240. Additionally, suspension arm 270*a* includes hydraulic ram 276*a* attached at one end 269*a* to upper housing and at another end 279*a* to wheel portion 278*a*. Wheel portion 278*a* is rotationally mechanically attached to latitudinal support 240 at one end and then to wheel assembly 290*a* at another end 284*a*.

Similar components, and even a mirror image of the components depicted in FIG. 2J, can be included on trailer 200 at or proximate to suspension arm 270*b* and wheel assembly 290*b* on another side end of latitudinal support 240.

Figure 2K:
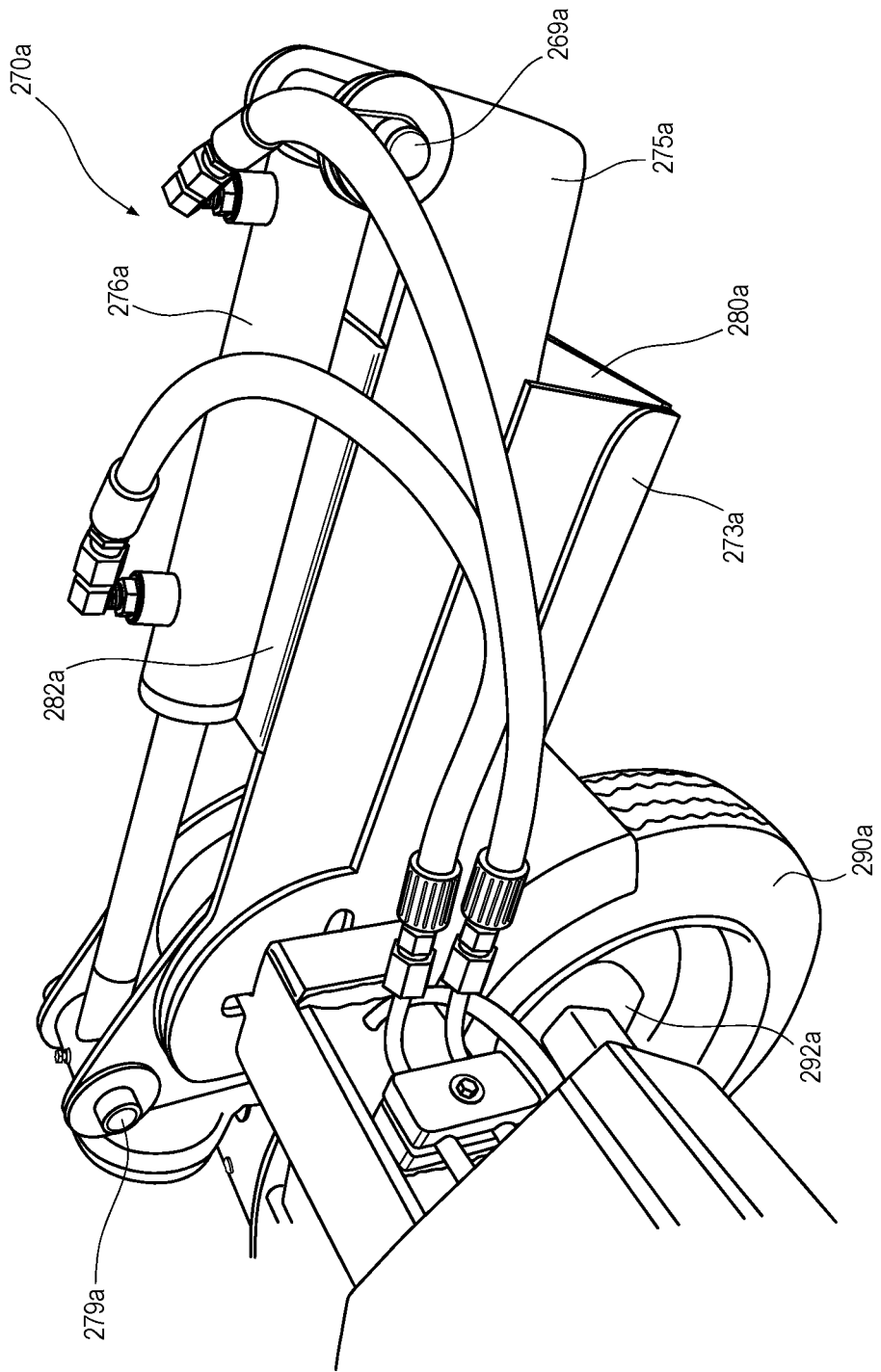
FIG. 2K illustrates a perspective view of an inner side of the suspension arm of FIG. 2I.

FIG. 2K illustrates a perspective view of an inner side of suspension arm 270*a* of the example trailer. As depicted, suspension arm 270*a* includes an inner side of lower housing 273*a*, an inner side of upper housing 275*a*, a bottom of lower housing 280*a*, and a top of lower housing 282*a*. As described, suspension arm 270*a* also includes hydraulic ram 276*a* mechanically attached at one end 269*a* to upper housing 275*a* and at another end 279*a* to wheel portion 278*a*.

Similar components, and even a mirror image of the features depicted in FIG. 2K, can be included on trailer 200 at or proximate to suspension arm 270*b*.

Figure 2L:
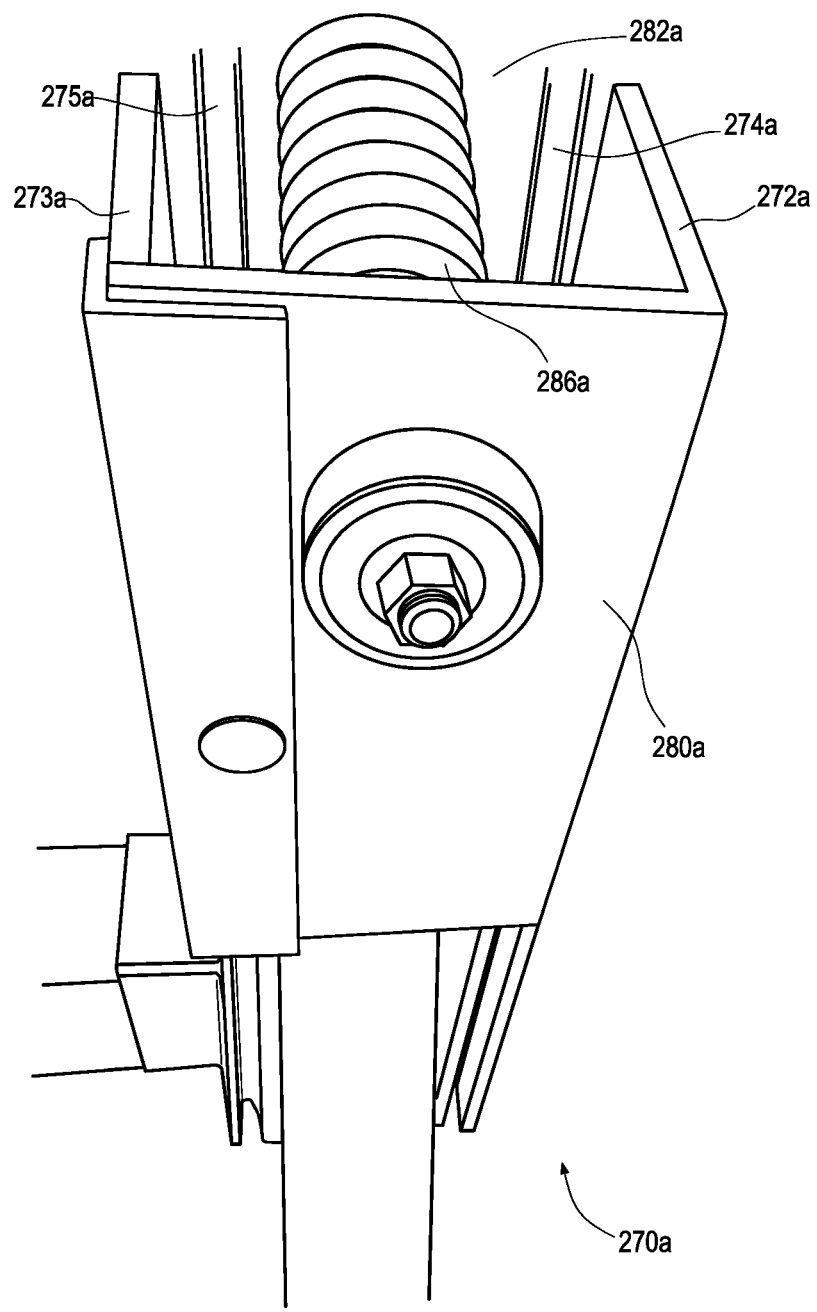
FIG. 2L illustrates a perspective view of a bottom side of the first suspension arm of FIG. 2I.

FIG. 2L illustrates a perspective view of a bottom side of suspension arm 270*a*. More specifically, FIG. 2L depicts a bottom of lower housing 280*a*, along with outer side 272*a* and inner side 273*a* of the lower housing. Moreover, a top of upper housing 282*a* is shown, along with outer side 274*a* and inner side 275*a* of the upper housing. Furthermore, FIG. 2L depicts spring 286*a* attached to the lower housing at bottom 280*a* and to the upper housing at top 282*a*. The spring can absorb mechanical shock when cargo is being transported.

Similar components, and even a mirror image of the components depicted in FIG. 2L, can be included on trailer 200 at or proximate to suspension arm 270*b*.

Figure 2M:
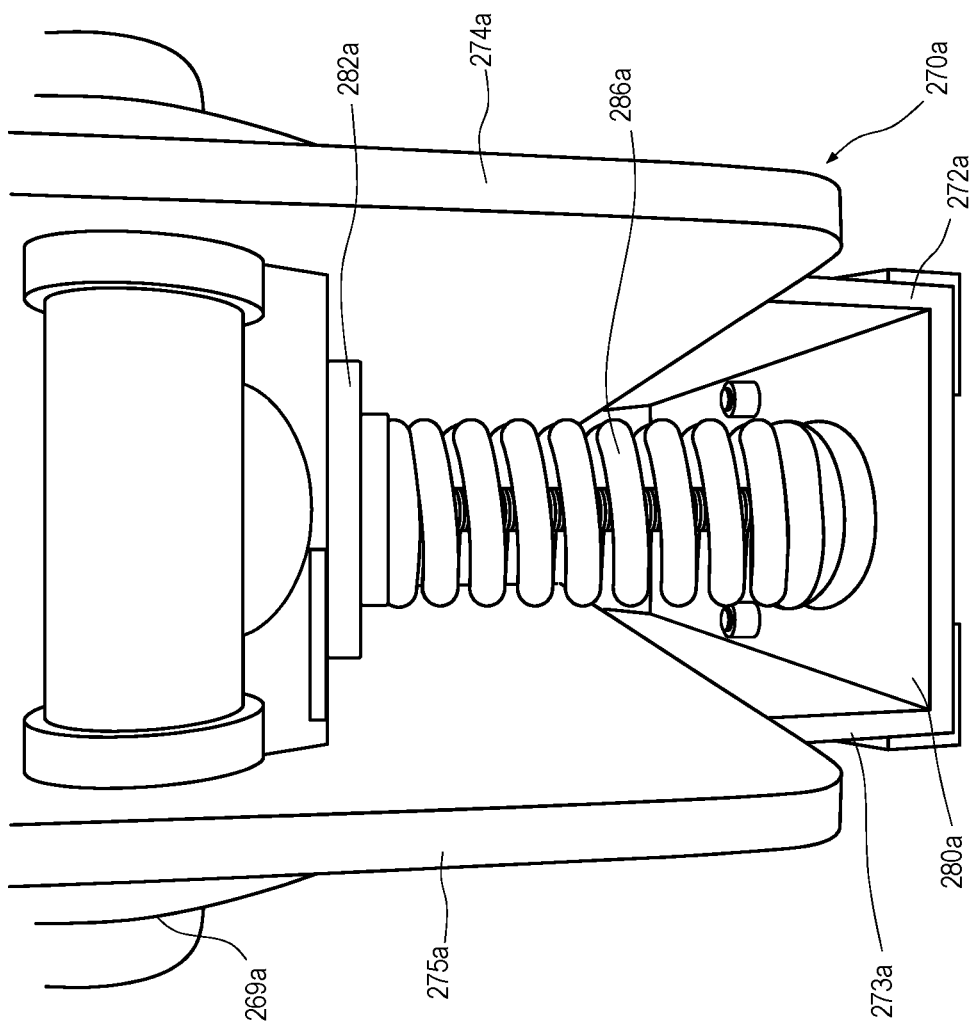
FIG. 2M illustrates a front view of the suspension arm of FIG. 2I.

FIG. 2M illustrates a front view of suspension arm 270*a*. As depicted, outer side 272*a*, inner side 273*a*, and bottom 280*a* of the lower housing along with outer side 274*a*, inner side 275*a*, and top 282*a* of the upper housing enclose spring 286*a* proximate one end 269*a* of the upper housing. Spring 286*a* is one type of a dampener which can alternatively include or be one of a coil spring, a leaf spring, a shock absorber, or other equivalents.

Similar components, and even a mirror image of the components depicted in FIG. 2M, can be included on trailer 200 at or proximate to suspension arm 270*b*.

Springs or dampeners at suspension arms 270*a* and 270*b* can provide the suspension for the trailer 200, thereby improving the ride and overall transportation when using trailer 200.

Figures 2N, 2O:
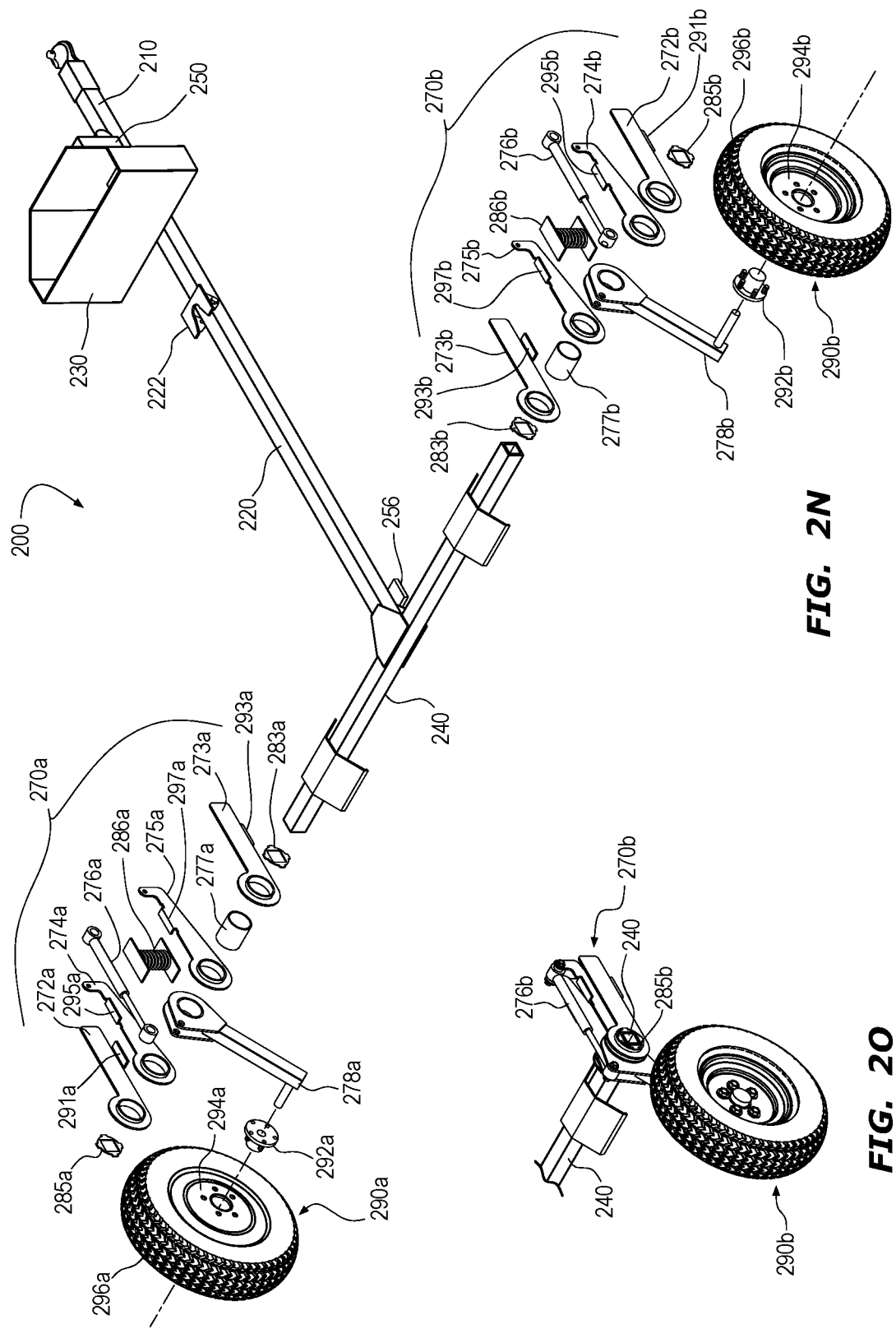
FIG. 2N illustrates a rear, second side perspective view of the example trailer including a more detailed view of the suspension arm and wheel assemblies of FIG. 2I.
FIG. 2O illustrates an assembled wheel assembly and suspension arm from FIG. 2N.

FIG. 2N illustrates a rear, second side perspective view of trailer 200 including a more detailed view of the suspension arm 270*a* and wheel assembly 290*a* of FIG. 2I. More particularly, FIG. 2N depicts trailer 200 including frame 210 having actuator 250 (e.g., hydraulic pump) attached on top of longitudinal support 220 which forms a T shape with latitudinal support 240 at the rear of trailer 200. Trailer 200 also includes suspension arms 270*a* and 270*b* attached to latitudinal support 240. Corresponding wheel assemblies 290*a* and 290*b* are attached to suspension arms 270*a* and 270*b* respectively. Actuator 250 is connected to respective hydraulic rams, like hydraulic ram 276*a* at suspension arm 270*a* and hydraulic ram 276*b* at suspension arm 270*b*, through flow divider 256. Flow divider 256 essentially equally divides the power (flow of hydraulic fluid) between actuator 250 and the two respective hydraulic rams 276*a* and 276*b* so that suspension arms 270*a* and 270*b* move in unison, in coordination, or simultaneously.

FIG. 2N further depicts an exploded detail of suspension arms 270*a* and 270*b*. Suspension arm 270*a* includes outer side 272*a* of the lower housing and inner side 273*a* of the lower housing. Suspension arm 270*a* also includes outer side 274*a* of the upper housing and inner side 275*a* of the upper housing. Thus, the lower housing and the upper housing enclose spring 286a. The lower housing is fixedly attached to latitudinal support 240, whereas the upper housing is rotationally attached to latitudinal support 240.

Similar components, or even a mirror image of these components, can be included at or proximate to suspension arm 270b. For example, suspension arm 270b includes outer side 272b of the lower housing and inner side 273b of the lower housing. Suspension arm 270b also includes outer side 274b of the upper housing and inner side 275b of the upper housing. Thus, the lower housing and the upper housing enclose spring 286b. The lower housing is fixedly attached to latitudinal support 240, whereas the upper housing is rotationally attached to latitudinal support 240.

FIG. 2N additionally depicts wheel portion 278a is rotationally attached to latitudinal support 240 at one end and then at another end wheel portion 278a has a hub 292a that attaches to wheel assembly 290a. Wheel assembly 290a includes rim 294a and tire 296a.

Similar components, or even a mirror image of these components, can be included at or proximate to suspension arm 270b and wheel assembly 290b. For example, wheel portion 278b is rotationally attached to latitudinal support 240 at one end and then at another end wheel portion 278b has a hub 292b that attaches to wheel assembly 290b. Wheel assembly 290a includes rim 294b and tire 296b.

As depicted, suspension arm 270a includes tabs 291a and 293a connected to outer side 272a and inner side 273a respectively. When suspension arm 270a is assembled, tabs 291a and 293a are situated beneath and in mechanical contact with spring 286a. Additionally, tabs 295a and 297a are connected to outer side 274a and inner side 275a respectively. When suspension 270a is assembled, tabs 295a and 297a are situated above and in mechanical contact with spring 286a. The arrangement of tabs or walls formed above and beneath spring 286a provides surfaces for spring 286a to push against.

As depicted, suspension arm 270b includes tabs 291b and 293b connected to outer side 272b and inner side 273a respectively. When suspension arm 270b is assembled, tabs 291b and 293b are situated beneath and in mechanical contact with spring 286b. Additionally, tabs 295b and 297b are connected to outer side 274b and inner side 275b respectively. When suspension 270b is assembled, tabs 295b and 297b are situated above and in mechanical contact with spring 286b. The arrangement of tabs or walls formed above and beneath spring 286a provides surfaces for spring 286b to push against.

Suspension arm 270a includes end connectors 283a and 285a and sleeve 277a. End connectors 283a and 285a can be configured as adapters. End connectors 283b and 285b can include structures to match with both the square structure of latitudinal support 240 and also to match with the circular structure of sleeve 277a.

Structures of end connector 283a can be slid onto latitudinal support 240. Sleeve 277a can be slid over latitudinal support 240 (the diameter of sleeve 277a can be larger than the diagonal distance between corners on the end of latitudinal support 240) and mated to other structures on end connector 283a. The circular holes in outer side 272a, outer side 274a, wheel portion 278a, inner side 275a, and inner sider 273a can be slid over sleeve 277a. Structures of end tab 285a can be slid onto latitudinal support 240 and other structures can be slid into sleeve 277a.

As such, when assembled, end connector 283a can retain the components of suspension arm 270a on an inner side and end connector 285a can retain the components of suspension arm 270a on an outer side. When assembled, outer side 272a, outer side 274a, wheel portion 278a, inner side 275a, and inner sider 273a can rotate about sleeve 277a as appropriate.

Similarly, suspension arm 270b includes end connectors 283b and 285b and sleeve 277b. End connectors 283b and 285b can be configured as adapters. End connectors 283b and 285b can include structures to match with both the square structure of latitudinal support 240 and also to match with the circular structure of sleeve 277b.

Structures of end connector 283b can be slid onto latitudinal support 240. Sleeve 277b can be slid over latitudinal support 240 (the diameter of sleeve 277b can be larger than the diagonal distance between corners on the end of latitudinal support 240) and mated to other structures on end connector 283b. The circular holes in outer side 272b, outer side 274b, wheel portion 278b, inner side 275b, and inner sider 273b can be slid over sleeve 277b. Structures of end tab 285b can be slide onto latitudinal support 240 and other structures can be slid into sleeve 277b.

As such, when assembled, end connector 283b can retain the components of suspension arm 270b on an inner side and end connector 285b can retain the components of suspension arm 270b on an outer side. When assembled, outer side 272b, outer side 274b, wheel portion 278b, inner side 275b, and inner sider 273b can rotate about sleeve 277b as appropriate.

FIG. 2O illustrates an assembled wheel assembly 290b and suspension arm 270b. As depicted, the components of suspension arm 270b are retained on an outer side by end connector 283b which is slid onto latitudinal support 240.

FIGS. 2A through 2O depict cargo 202, in the form of a vehicle, namely a side-by-side vehicle, transported by trailer 200. However, various aspects may also comprise a portable structure. For example, trailer 200 can be used to load, unload, and transport a portable structure selected from among one or more of: a portable concession stand, a portable toilet, a portable coffee shop, a portable restaurant, or a portable food truck.

The presently described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A trailer for transporting a side-by-side vehicle, the trailer comprising:
    a frame, including:
        a longitudinal support having a front end and a rear end, the front end of the longitudinal support having a trailer coupler; and
        a latitudinal support attached to the rear end of the longitudinal support at a middle of the latitudinal support, the latitudinal support having a first side end and a second side end;
    a compartment attached to a top of the longitudinal support proximate the front end of the longitudinal support;
    a hydraulic pump including a motor housed inside the compartment, a reservoir of hydraulic fluid attached to the longitudinal support outside the compartment, and a remote control housed inside the compartment;
    a battery connected to the hydraulic pump, the battery housed inside the compartment;

a first suspension arm attached to the first side end of the latitudinal support, including:
- a first lower housing attached to the latitudinal support;
- a first upper housing rotationally attached to the latitudinal support;
- a first wheel portion rotationally attached to the latitudinal support;
- a first hydraulic ram attached at one end to the first upper housing and at another end to the first wheel portion; and
- a first spring attached to the first lower housing and the first upper housing;

a second suspension arm attached to the second side end of the latitudinal support, including:
- a second lower housing attached to the latitudinal support;
- a second upper housing rotationally attached to the latitudinal support;
- a second wheel portion rotationally attached to the latitudinal support;
- a second hydraulic ram attached at one end to the second upper housing and at another end to the second wheel portion; and
- a second spring attached to the second lower housing and the second upper housing;

a first wheel assembly attached to the first wheel portion of the first suspension arm;
a second wheel assembly attached to the second wheel portion of the second suspension arm;
wherein the hydraulic pump simultaneously actuates the first hydraulic ram and the second hydraulic ram to contract or extend the respective first suspension arm and the second suspension arm to move the latitudinal support of the frame between a lower loading position and an upper transport position.

2. The trailer of claim 1, further comprising a trailer jack attached proximate the front end of the longitudinal support of the frame.

3. The trailer of claim 1, further comprising a cargo coupler attached atop the longitudinal support of the frame, the cargo coupler configured to mate with a cargo button attached to an underside of the side-by-side vehicle.

4. The trailer of claim 3, further comprising a winch attached to the longitudinal support of the frame between the compartment and the cargo coupler.

5. The trailer of claim 1, further comprising:
- a first ramp attached proximate the first side end of the latitudinal support of the frame;
- a second ramp attached proximate the second side end of the latitudinal support of the frame; and
- wherein the first ramp and the second ramp are equally spaced opposite one another from the middle of the latitudinal support of the frame.

6. The trailer of claim 1, further comprising a flow divider connected between the hydraulic pump and the first and second hydraulic rams to equally distribute hydraulic energy of the hydraulic pump between the first hydraulic ram and the second hydraulic ram such that the first hydraulic ram and the second hydraulic ram move in unison when actuated by the hydraulic pump.

\* \* \* \* \*